United States Patent
Dickie et al.

(10) Patent No.: US 10,831,713 B2
(45) Date of Patent: *Nov. 10, 2020

(54) HARDWARE ACCELERATION FOR A COMPRESSED COMPUTATION DATABASE

(71) Applicant: International Business Machines Corporation, Armonk, NY (US)

(72) Inventors: Garth A. Dickie, Framingham, MA (US); Michael Sporer, Austin, TX (US); Jason A. Viehland, Framingham, MA (US)

(73) Assignee: International Business Machines Corporation, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/791,770

(22) Filed: Oct. 24, 2017

(65) Prior Publication Data

US 2018/0052863 A1 Feb. 22, 2018

Related U.S. Application Data

(63) Continuation of application No. 14/505,730, filed on Oct. 3, 2014, now Pat. No. 9,836,473.

(51) Int. Cl.
*G06F 7/00* (2006.01)
*G06F 16/174* (2019.01)
(Continued)

(52) U.S. Cl.
CPC ........ *G06F 16/1744* (2019.01); *G06F 16/215* (2019.01); *G06F 16/2365* (2019.01)

(58) Field of Classification Search
CPC .......... G06F 8/4434; G06F 2211/1014; G06F 2212/401; G06F 9/30178; G06F 16/1744; G06F 16/2365; H03M 7/30
(Continued)

(56) References Cited

U.S. PATENT DOCUMENTS 7,420,992 B1 9/2008 Fang
7,480,489 B2 1/2009 Eslick et al.
(Continued)

OTHER PUBLICATIONS

Nilakantan et al., "Metrics for Early-Stage Modeling of Many-Accelerators Architectures", IEEE Computer Architecture Letters, vol. 12, Issue 1, Jan.-Jun. 2013, pp. 25-28.
(Continued)

*Primary Examiner* — Mohammed R Uddin
(74) *Attorney, Agent, or Firm* — Robert Bunker; Edell, Shapiro & Finnan, LLC

(57) ABSTRACT

According to embodiments of the present invention, machines, systems, methods and computer program products for hardware acceleration are presented. A plurality of computational nodes for processing data is provided, each node performing a corresponding operation for data received at that node. A metric module is used to determine a compression benefit metric pertaining to performance of the corresponding operations of one or more computational nodes with recompressed data. An accelerator module recompresses data for processing by the one or more computational nodes based on the compression benefit metric indicating a benefit gained by using the recompressed data. A distribution function may be used to distribute data among a plurality of nodes.

20 Claims, 13 Drawing Sheets

(51) Int. Cl.
*G06F 16/215* (2019.01)
*G06F 16/23* (2019.01)

(58) Field of Classification Search
USPC .............................. 707/688, 693, 802, 811
See application file for complete search history.

(56) References Cited

U.S. PATENT DOCUMENTS

| | | | |
|---|---|---|---|
| 7,925,863 | B2 | 4/2011 | Hundley |
| 8,447,948 | B1 | 5/2013 | Erdogan |
| 8,468,151 | B2 | 6/2013 | Branscome et al. |
| 8,943,029 | B2 | 1/2015 | Marwah |
| 9,330,105 | B1 | 5/2016 | Duprey |
| 9,350,384 | B2 | 5/2016 | Ackerman et al. |
| 9,356,621 | B2 | 5/2016 | Ackerman et al. |
| 9,514,147 | B2 | 12/2016 | Ackerman et al. |
| 9,514,148 | B2 | 12/2016 | Ackerman et al. |
| 9,514,149 | B2 | 12/2016 | Ackerman et al. |
| 9,519,651 | B2 | 12/2016 | Ackerman et al. |
| 9,535,923 | B2 | 1/2017 | Ackerman et al. |
| 2003/0202527 | A1 | 10/2003 | Nahapetian |
| 2005/0071579 | A1 | 3/2005 | Luick |
| 2005/0104753 | A1 | 5/2005 | Dror |
| 2006/0101206 | A1 | 5/2006 | Wood |
| 2007/0104118 | A1* | 5/2007 | Mega ..................... H04L 43/00 370/254 |
| 2007/0198621 | A1 | 8/2007 | Lumsdaine |
| 2009/0319550 | A1 | 12/2009 | Shau |
| 2011/0271055 | A1 | 11/2011 | O'Connor |
| 2011/0307659 | A1 | 12/2011 | Hans et al. |
| 2011/0320417 | A1 | 12/2011 | Luo |
| 2011/0320768 | A1 | 12/2011 | Pell et al. |
| 2012/0117027 | A1 | 5/2012 | Shau et al. |
| 2012/0154412 | A1 | 6/2012 | Harney et al. |
| 2013/0159811 | A1 | 6/2013 | Biran et al. |
| 2013/0268489 | A1 | 10/2013 | Surlaker et al. |
| 2014/0032516 | A1 | 1/2014 | Sukhwani et al. |
| 2014/0195498 | A1 | 7/2014 | Asher |
| 2014/0351229 | A1 | 11/2014 | Gupta |
| 2015/0088945 | A1 | 3/2015 | Kruus |
| 2015/0120683 | A1 | 4/2015 | Okuyama |
| 2015/0149739 | A1* | 5/2015 | Seo ..................... G06F 3/0608 711/162 |
| 2016/0094242 | A1 | 3/2016 | Ackerman et al. |
| 2016/0094243 | A1 | 3/2016 | Ackerman et al. |
| 2016/0098420 | A1 | 4/2016 | Dickie |
| 2016/0098439 | A1 | 4/2016 | Dickie et al. |
| 2016/0196278 | A1 | 7/2016 | Ackerman et al. |
| 2016/0197622 | A1 | 7/2016 | Ackerman et al. |
| 2016/0204797 | A1 | 7/2016 | Ackerman et al. |
| 2016/0204798 | A1 | 7/2016 | Ackerman et al. |
| 2016/0204799 | A1 | 7/2016 | Ackerman et al. |

OTHER PUBLICATIONS ip.com et al.; "Chaining Co-Processors for Greater Efficiency", IPCOM000203893D, Feb. 8, 2011, pp. 1-3.

Lyons et al.; "The Accelerator Store Framework for High-Performance, Low-Power Accelerator-Based Systems", IEEE Computer Architecture Letters, vol. 9, Issue 2, Jul.-Dec. 2010, pp. 53-56.

"Capture and display of performance profile for dataflow graph", IP.com 000232481, Nov. 11, 2013, 4 pages.

List of IBM Patents or Patent Applications Treated As Related, Oct. 24, 2017, 1 page.

* cited by examiner

HARDWARE ACCELERATION FOR A COMPRESSED COMPUTATION DATABASE

CROSS-REFERENCE TO RELATED APPLICATIONS

This application is a continuation of U.S. patent application Ser. No. 14/505,730, entitled "HARDWARE ACCELERATION FOR A COMPRESSED COMPUTATION DATABASE" filed Oct. 3, 2014, the disclosure of which is incorporated herein by reference in its entirety.

BACKGROUND

Present invention embodiments relate to compression and storage of data, and more specifically, to utilizing hardware to accelerate computation and improve performance for a data processing system that stores compressed data.

The best performing software-only (i.e. able to run on arbitrary computer hardware) architectures perform computation directly on compressed data. A performance goal for such Central Processing Unit (CPU) algorithms is to achieve a rate of computation that is directly proportional to the compressed size of the data or better. Although the CPU operates directly on compressed data, and thus, the results of computation are again compressed data, the quality of compression may degrade with each successive round of computation. For example, in some cases, CPU output data may be fully decompressed, be compressed using a dictionary with duplicate entries, or be compressed using a run-length encoding (RLE) scheme where some adjacent runs have the same value. As the compression degrades, the performance of computation also degrades.

Attempting to utilize a hardware accelerator to accelerate computation by placing the accelerator in the same position in the data path as the software does not generally achieve a desired acceleration effect. For example, placing a hardware accelerator, such as a Field Programmable Gate Array (FPGA), in the same position in the datapath as the CPU, to perform the same operations as the CPU, is generally not effective because the system has been designed to maximize CPU capabilities, e.g., multi-level high performance caches, virtual memory mapping, register renaming, etc. Such operations do not map easily onto an FPGA.

SUMMARY

According to embodiments of the present invention, machines, systems, methods and computer program products for hardware acceleration are presented comprising a data processing system comprising a plurality of computational nodes each performing a corresponding operation for data received at that node, a metric module to determine a compression benefit metric, pertaining to performance of the corresponding operations of one or more computational nodes with recompressed data, and an accelerator module to recompress the data for processing by the one or more computational nodes based on the compression benefit metric indicating a benefit gained by using the recompressed data. A computational node may perform operations including arithmetic or database operations, e.g., aggregation or joins on input data from a source such as a storage device or a cache, to produce output data. A computational node also may export data to a database client, or may act as a pure source or pure sink, synthesizing or consuming data.

These and other aspects, features and embodiments of the present invention will be understood with reference to the drawing figures and the detailed description herein, and will be realized by way of the various elements and combinations particularly pointed out in the appended claims. It is to be understood that both the foregoing general description and the following brief description of the drawings and detailed description are examples and are explanatory of preferred embodiments of the invention, and are not restrictive of present invention embodiments, as claimed.

BRIEF DESCRIPTION OF THE SEVERAL VIEWS OF THE DRAWINGS

Generally, like reference numerals in the various figures are utilized to designate like components.

DETAILED DESCRIPTION

Figure 1:
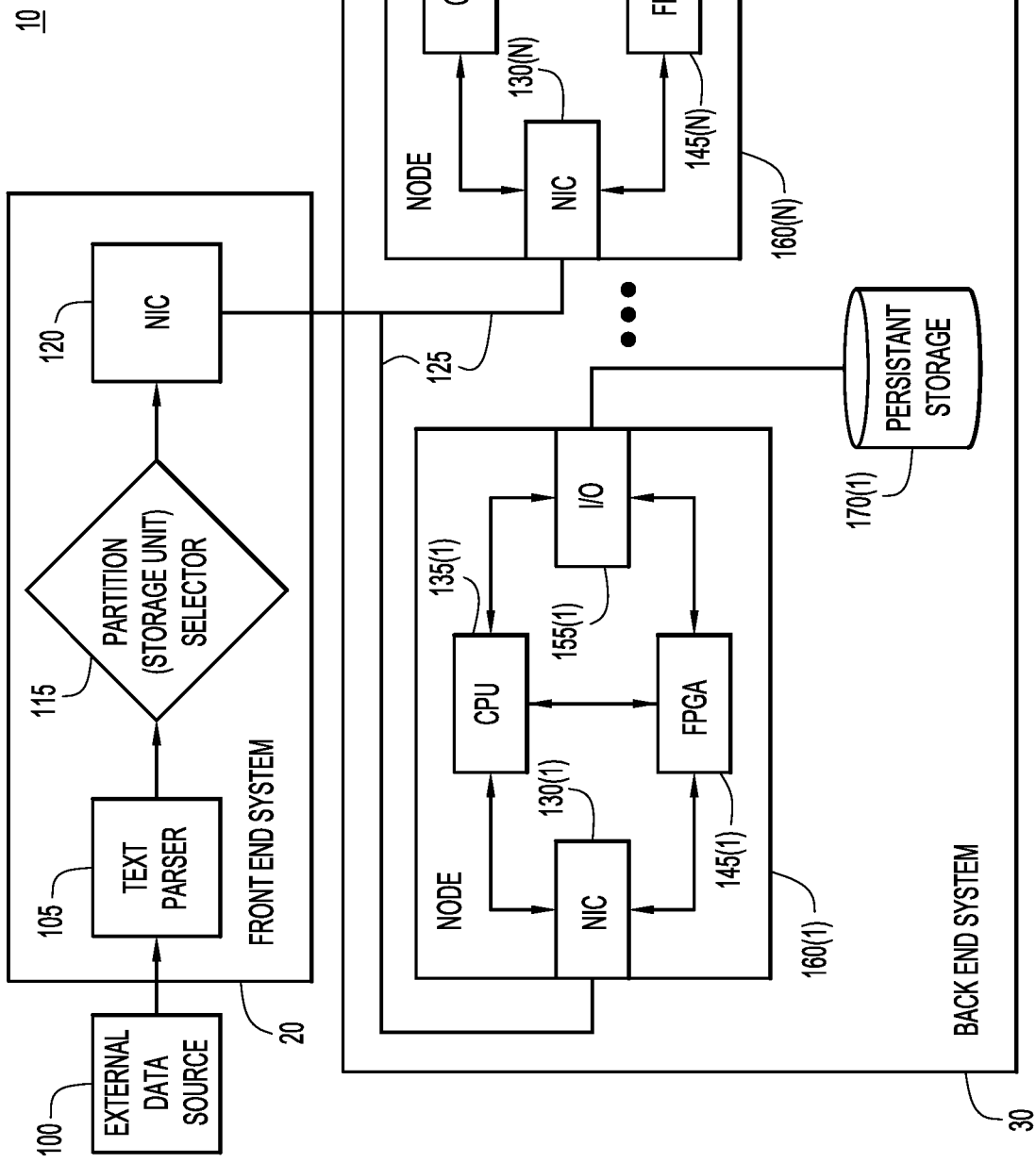
FIG. 1 is a diagrammatic illustration showing an example of a massively parallel database system in which information is compressed and stored in accordance with an embodiment of the present invention.

Present invention embodiments comprise a data processing system comprising a plurality of computational nodes for processing data, each performing a corresponding operation for data received at that node, a metric module to determine a compression benefit metric, pertaining to performance of the corresponding operations of one or more computational nodes with recompressed data, and an accelerator module to recompress the data for processing by the one or more computational nodes based on the compression benefit metric indicating a benefit gained by using the recompressed data.

For each computational node, a compression benefit metric may be determined. The compression benefit metric may include one or more of the following factors: (1) an amount or a type(s) of compression preserved by each destination computational node, which is usually statically determined, (2) a measure of an estimated reduction in a size of data resulting from recompressing the chunk of data, which is usually dynamically determined, according to one or more compression types, (3) a measure of an estimated computational/performance benefit from a destination node receiving and computing on recompressed data, and (4) a measure of a computational benefit of a destination node receiving and computing on data in a particular compressed form. These metrics may be combined to generate a composite compression benefit metric for each chunk of data appearing on a computational node input, representing an overall benefit obtained by recompressing the chunk of data.

Given a network of computational nodes, a compression benefit metric may be propagated through the network of computational nodes to statically determine a compound/cumulative compression benefit metric at each subsequent node, from the next one or more stages of processing after the present node.

An accelerator module may re-compress data for processing by one or more of the computational nodes based on the compression benefit metric or metric scores. This allows network capacity and bandwidth to be optimized as well as data processing performance to be accelerated, as fewer resources are needed to perform desired computations. Additionally, the computational benefit of recompression may also be balanced against the computational cost of recompressing data on a particular system. For instance, if recompression is performed on the same hardware as normal processing, then a light weight recompression algorithm that screens for and selects candidates for recompression may be used to optimize resources. In many cases, utilizing a full compression algorithm is too time consuming to provide a significant performance benefit. In other embodiments, recompression is performed on specialized hardware that is not used for normal processing, and candidates for recompression are processed in priority order until recompression throughput of the specialized hardware is fully utilized.

Present invention embodiments allow a data processing system to be designed and implemented as an integrated hardware-software device, also referred to as an "appliance", to achieve maximum or improved performance. Aside from computational performance, other parameters may include specified limits for power dissipation, cost of the device, and physical space occupied by the device.

Present invention embodiments utilize a hardware accelerator to reformat or recompress data, so that the CPU can perform faster computations, rather than offload the work regularly performed by the CPU to an accelerator. In cases in which the result of a computation may not be optimally compressed, the accelerator is given the job of recompressing data chunks before the data is provided to downstream processing nodes for further computation.

To achieve this, a specialized database hardware accelerator, e.g., an FPGA or Application Specific Integrated Circuit (ASIC), is given access to data as it flows between computational nodes on a CPU. In one embodiment, access is provided by placing the accelerator on a Peripheral Component Interface (PCI) bus with access to Random Access Memory (RAM). In another embodiment, the accelerator may also be placed on a bus with access to the CPU cache and memory management unit. In still another embodiment, the accelerator may also be placed directly on the path between the CPU and storage, e.g., by placing a storage controller on the same expansion card or in the same FPGA as the accelerator, or alternatively, on the path between the CPU and the network, e.g., by placing a network controller on the same expansion card or in the same FPGA as the accelerator.

Data is processed in data chunks, also known as work items, tuple-sequence-number ranges, zones, or batches. Data chunks in transit between storage and CPU, network and CPU, or between CPU computational nodes may be interrupted by the accelerator and reformatted or recompressed to obtain a subsequent benefit in CPU processing.

Present invention embodiments are not limited to a particular type of data. For example, integer, character and floating point data types may all be used as well as other data types.

Present invention embodiments are also not limited to a particular representation of characters. For example, American Standard Code for Information Interchange (ASCII), Extended Binary Coded Decimal Interchange Code (EBCDIC), Unicode Transformation Formats (UTFs) such as UTF-8, UTF-16, or any other suitable representation of characters may be used.

The techniques of present invention embodiments generally apply to, but are not intended to be limited to, massively parallel systems. Databases or storage locations may be local to or remote from each other. In some embodiments, data may be stored in columnar format, e.g., in which columns of a data table are stored across multiple storage locations. Storing data in columnar format may have significant advantages in terms of achieving a higher compression ratio (as compared to storing data in row format), as data is usually more structurally similar in columnar format and a higher compression ratio may be achieved. Storing data in columnar format also allows for accelerated access to a subset of the columns; columns not involved in a particular query are not read from storage. In other embodiments, data is not stored in a columnar way, and is accessed by a column-aware system. In both cases, data is generally stored in compressed format, allowing fewer memory resources to be consumed for storage.

FIG. 1 shows an example of a massively parallel database system 10 in which data is being loaded/written into the system and stored. An external data source 100 provides data that is to be stored in any of persistent storage units 170(1)-170(N). The data may be processed by a front end system 20, which may comprise a text parser 105, a partition or storage unit selector 115, and a network interface unit or card (NIC) 120 that transmits data over a high speed network 125 to nodes of a back end system 30. Partition or storage unit selector 115 may select one or more storage units 170 for storing incoming data, which is compressed prior to storage.

Back end system 30 may comprise a series of blades or nodes 160(1)-160(N), each blade comprising a NIC 130 for receiving data, a CPU 135 and a FPGA 145 for compressing received data, and an input/output (I/O) interface 155 for sending compressed data to persistent storage units 170. In some embodiments, and as shown in FIG. 1, a series of bidirectional links may exist between the components of each node, e.g., NIC 130←FPGA 145, FPGA 145←I/O 155, I/O 155←CPU 135, CPU 135←NIC 130, and CPU 135←FPGA 145. In some embodiments, a subset of the components, e.g., FPGA 145, NIC 130, and the I/O module 155 may have close physical proximity in the internal network, e.g., connected by a PCI on the same card, possibly with a separate PCI switch on the card; or implemented internally to a FPGA and connected to the rest of the FPGA by a PCI or other interface, etc. In other embodiments, one or more of FPGA 145, CPU 135, I/O storage adapter 155, and network adapter 130 are peers on a "cloud". In still other embodiments, one or more of FPGA 145, CPU 135, I/O storage adapter 155, and network adapter 130 are all peers on an unspecified network such as PCI. In these cases, the CPU may have local memory, and the FPGA may also have local memory.

In a system with a hardware accelerator 145 for recompression, the hardware accelerator is likely the most efficient implementation of the compression engine and may be used in the write path to compress data efficiently. The CPU 135 may also be engaged in compression, at least for data types or data ranges for which the hardware accelerator is incapable of processing, and possibly also as a secondary method of data compression allowing more data to be compressed at once, increasing throughput. Output data may be in a compressed data structure format, and the compressed data structure format may be serialized or flattened into bits prior to being sent to storage 170 via I/O interface 155.

The system may comprise a plurality of blades 160, e.g., for a system containing N blades, the system may comprise NICs 130(1)-130(N), I/O interfaces 155(1)-155(N), FPGAs 145(1)-145(N), CPUs 135(1)-135(N), and persistent storage units 170(1)-170(N).

The environment may include one or more blades/nodes 160, one or more storage units 170, and one or more front end systems 20. Blades/nodes 160 and front end system 20 may be remote from each other and communicate over a network 125. The network may be implemented by any number of any suitable communications media (e.g., wide area network (WAN), local area network (LAN), Internet, Intranet, etc.). Alternatively, blades/nodes 160 and front end system 20 may be local to each other, and communicate via any appropriate local communication medium (e.g., local area network (LAN), hardwire, wireless link, Intranet, etc.).

In general, columns relating to a set of rows are stored near each other, e.g., in the same node 160. This ensures that predicate evaluation for a single row, and row re-assembly may proceed locally with respect to the node, without network communication. A primary benefit of columnar storage is that the compressed data representing columns which are not involved in a query need not be read, reducing the total I/O cost of a query.

The column-oriented architectures and computational techniques of present invention embodiments operate on compressed data, minimizing the need to provide access to decompressed data.

Figure 2:
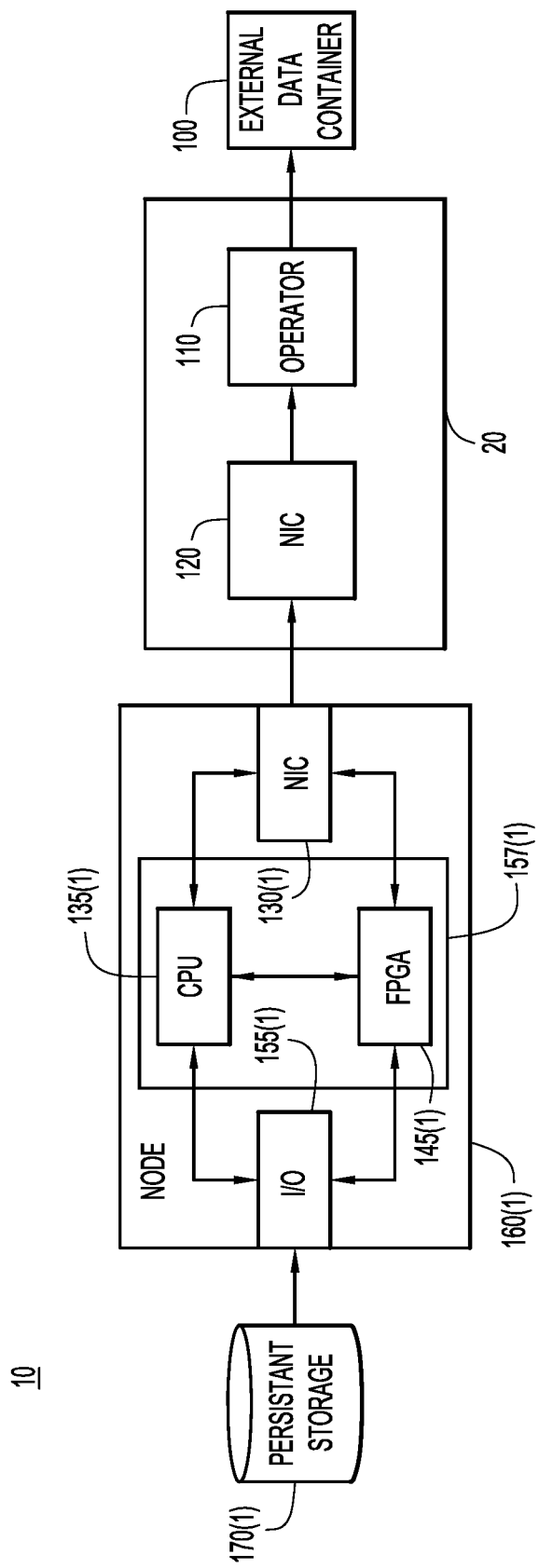
FIG. 2 is a diagrammatic illustration showing an example of a massively parallel database system in which compressed information is accessed during query processing in accordance with an embodiment of the present invention.

FIG. 2 shows an illustration of query processing to identify and extract data that has been stored in compressed format in one or more persistent storage unit(s) 170. Upon receiving query parameters from a user/host, the query is evaluated to identify and retrieve relevant data stored in compressed format in persistent storage unit 170(1). The flow of data from the storage unit 170(1) through node 160(1) and the front end system 20 are shown. It is understood that multiple storage units as well as multiple nodes may be present. For simplicity, only one storage unit and node are shown.

FIG. 2 also shows a pathway for a simple query in which results are returned to an external consumer. Data from persistent storage unit 170(1) progresses through node 160(1), and in particular, through I/O module 155(1), data processing module 157(1) and NIC 130(1) for transmitting data to front end system 20. Data processing module 157(1) includes an accelerator, e.g., FPGA 145(1) which re-compresses data "on the fly". In some embodiments, CPU 135(1) may also recompress data. Front end system 20 may comprise a receiving module NIC 120 for receiving data from node 160(1), an operator 110, and an external data container 100 that is used to package information to be provided/displayed to a consumer. Operator 110 may govern returning and formatting retrieved data to an external consumer.

In other embodiments, a query segment may also produce results which are used locally with respect to node 160(1), which are re-distributed to or broadcast to the other nodes 160(N), or are further processed on the front end system 20 before being re-distributed to or broadcast to the nodes 160(N).

CPU 135(1) may include many different types of functions, including but not limited to, performing filtering, join or aggregation operations, performing queries on compressed data, passing data relevant to a query to the front end system, and recompressing data.

In some embodiments, FPGA 145 may perform filtering, recompression, or other operations to accelerate computation prior to sending data to the CPU for further computation. The CPU 135 may receive the output of FPGA 145 and perform further computation as needed. In other embodiments, data may not be selected for recompression by the FPGA, and may be sent directly to the CPU. The accelerator may function as a peer of the CPU, performing recompression on data between computational nodes running on the CPU, including nodes before the first computational node, i.e. near the storage I/O 155, or after the last computational node, i.e. near the network I/O 130.

Figure 10:
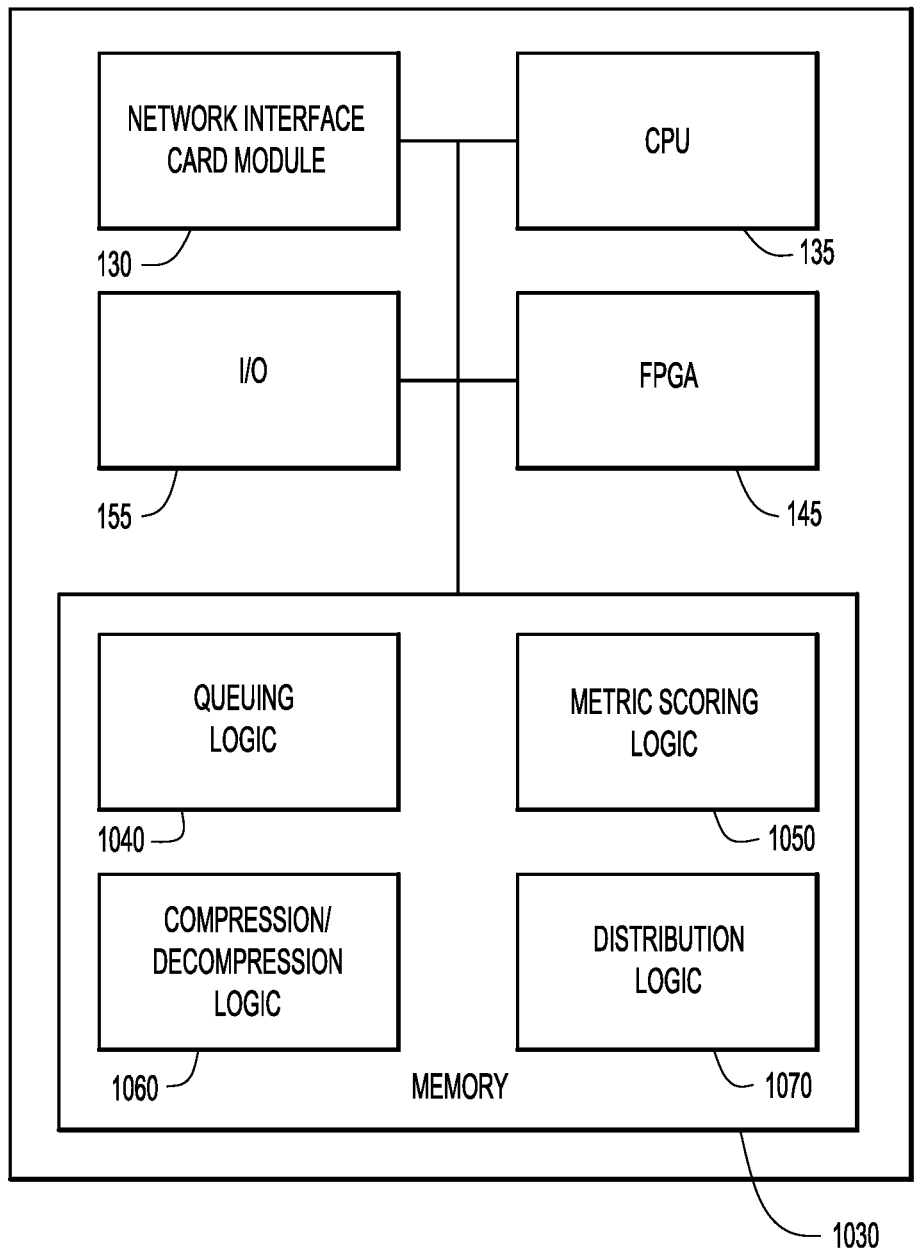
FIG. 10 is a block diagram of an apparatus for hardware acceleration on compressed data in accordance with an embodiment of the present invention.

FPGA 145(1) may act as a low cost accelerator helping to meet performance goals within a specified cost and power envelope. As data becomes less optimally compressed, a metric module 1050, as shown in FIG. 10, may evaluate incoming data chunks and determine whether performance may be increased or improved by recompressing or reformatting the data, based upon a compression benefit metric, prior to sending to the CPU.

Figure 3:
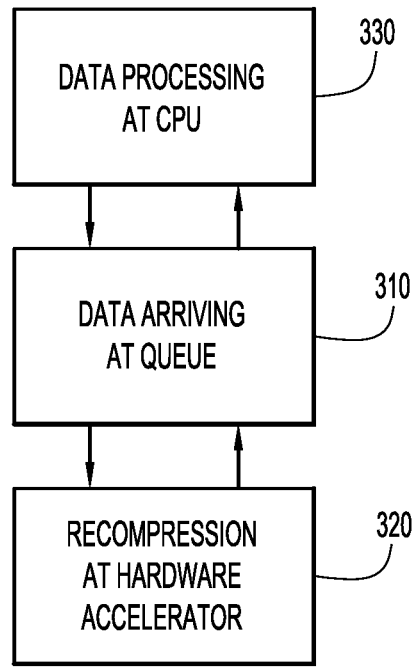
FIG. 3 is a procedural flow chart of a manner of utilizing a hardware accelerator in accordance with an embodiment of the present invention.

Referring to FIG. 3, three processes are shown as running concurrently, in regard to data processing module 157, to optimize hardware acceleration. At 310, data arrives at a data buffer or a queue. The data is then provided to the hardware accelerator for recompression at 320, or is provided to the CPU (for possible recompression) and query processing at 330. All three of these processes may run in parallel.

FIGS. 4A-E show example flow charts associated with operations at 310, 320 and 330, and with determining a compression benefit metric for prioritization of recompressing chunks of data. By augmenting each node with information, including an empirical measure of how much benefit is gained from having well-compressed data, and how much compression is preserved by each node, as well as information pertaining to a reduction in a size of a data chunk, if compressed, and a benefit from performing computations on data compressed in a particular manner, a total benefit of having well-compressed data on each edge in the graph (e.g., as shown in FIG. 5) may be determined.

In general, each data computational node has a "ready" condition that indicates that it is ready to run. Usually but not always, this condition is dependent on data chunks existing for some subset of the inputs to the computational node.

Figure 4A:
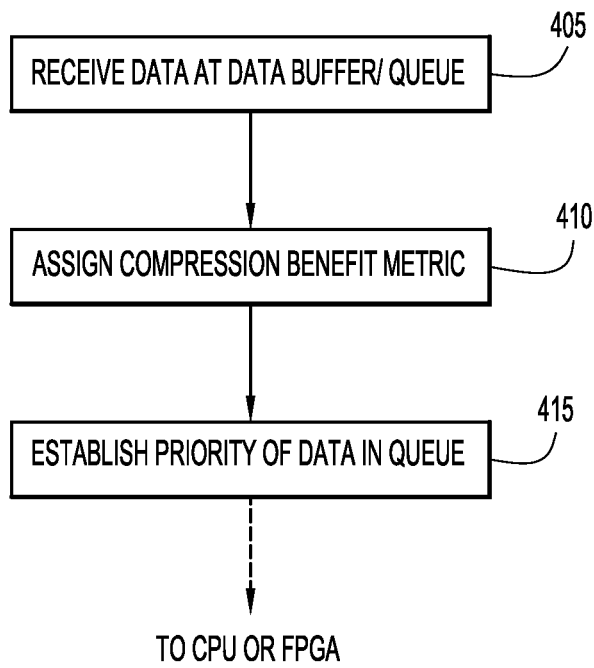
FIGS. 4A-4E are procedural flow diagrams of more specific examples of utilizing a hardware accelerator to accelerate computation in accordance with embodiments of the present invention.
Figure 5:
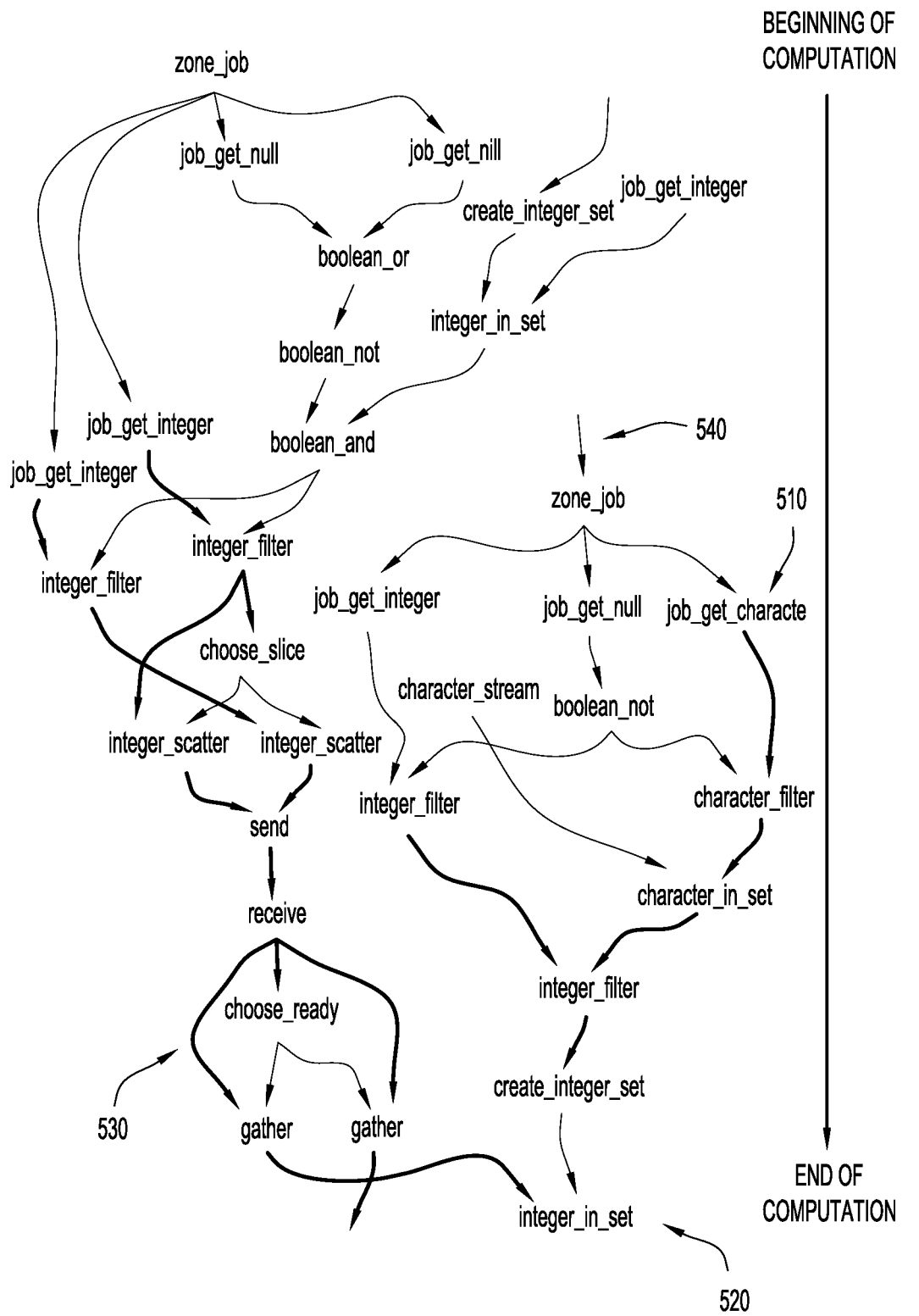
FIG. 5 is a diagrammatic illustration of a dataflow graph, in accordance with an embodiment of the present invention.

In FIG. 4A, data is received at a queue/data buffer at operation 405. This data, which is available for processing by one or more computational nodes, arrives from a network interface, from a storage system, or is generated as the output of a computational node. Once the data enters the data queue, a compression benefit metric, which is a measure of the benefit to be obtained by recompressing the data, is generated at operation 410.

At operation 410, a compression benefit metric is determined for a chunk of data. Each compressed data chunk is augmented with an estimate as to how well compressed the data chunk could be if recompressed. In some embodiments, the score could have error bars. An estimated best size when using a particular type of compression, e.g., RLE, dictionary encoding, bit shaved compression, etc., may be used in computing the compression benefit metric. As an example, a RLE compressed chunk whose values have been replaced with smaller values, might estimate that some computational runs would merge if the chunk was recompressed. As another example, data emerging from the inner table of a hash join operation might estimate that recompression using a new dictionary would result in a compression ratio similar to the compression ratio apparent in the inner table data before the hash table was built. Additionally, each node may be augmented with information that indicates how well data compression is preserved at a particular node; this is also used in determining the compression benefit metric for a chunk of data arriving for processing at that node.

By evaluating data preservation for all down-stream nodes for one or more flows through a data graph, and scaling this result by a compression preservation score indicating preservation of compression for each node, a composite preservation score for a data flow may be determined.

At operation 415, the compression benefit metric is utilized to establish the priority (or position) of the data in the data queue. All data chunks are placed in a priority queue according to a priority based upon the compression benefit metric from operation 410. An accelerator re-compresses chunks which have the highest priority in the queue, that is, the data chunks projected to have the most benefit from recompression.

It is noted that certain node types, e.g., a "scatter" node, which deal data into multiple outputs, may not be able to process compressed data at all, and will always decompress the data during processing. These node types receive little benefit from recompression. In other embodiments, other node types, e.g., unary arithmetic operators like "not" or "negate" or unary string operations such as "trim", operate on each distinct value independently, and receive maximum benefit from operating on compressed data.

In some embodiments, the compression benefit metric could represent a time savings. For example, for each node in the graph, three empirically determined scores may be determined: a compression preservation score P, a computational cost score C (computation time per value), and a compression sensitivity score S. For example, an integer arithmetic operator might have a lower computational cost score C of '1', while a string concatenation operator might have a higher computational cost score of '50'. As another example, a compression sensitivity score S of '0' may represent little or no benefit from operating on compressed data, a score of '1' may mean that the computational node runs in time proportional to the compressed data size, and a score greater than '1' may mean that the node is more sensitive, exhibiting further improvements in performance. Additionally, inputs transmitted to a particular output (if any) for each node may be indicated. For a chunk of data with size M0, which recompresses to size M1, the expected immediate benefit of recompressing the chunk of data (before processing at this node) may be represented as (M0−M1)*S*C. For example, a scoring scheme may assign high scores to nodes performing operations that are sensitive to compression and low scores to nodes that are not sensitive to compression. High scores may be assigned to nodes that incur a computational cost for recompressing data and to nodes which poorly preserve data compression.

In other embodiments, a more elaborate cascaded computation may find all output edges, e.g., using information from a data flow graph, which receive a particular chunk of data as input. For each output edge, a computation may be performed, e.g., (M0−M1)*P times S*C, to determine benefits generated by recompression for a downstream node receiving data from that edge. The computation may also consider how much compression is lost due to processing at the present node as well. This calculation may proceed to any level by applying the P compression preservation score of downstream nodes, and S*C for further downstream nodes.

The data may then be processed by the hardware accelerator or the CPU, e.g., based upon flowcharts associated with FIGS. 4B-4E. In general, the hardware accelerator will request the highest-benefit block from the buffer, recompress it, and will return it to the buffer at a position indicating low priority, placed at the bottom of a priority queue for recompression. The CPU, which performs work on the data, may request any block from the buffer, and may recompress data, which may also be returned to the buffer. For chunks of data projected to have a low compression benefit metric, such data may be sent to the CPU for further processing as part of a query.

Figure 4B:
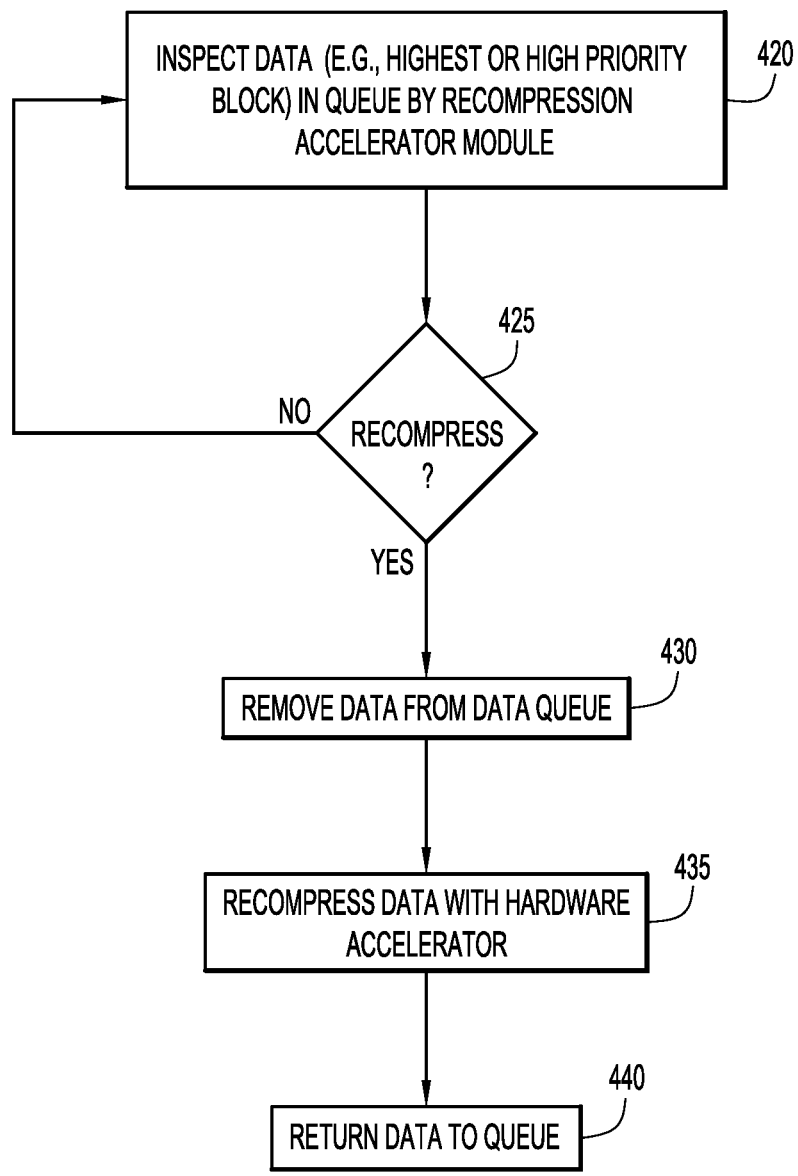

FIG. 4B shows an example of a recompression accelerator module. At operation 420, the highest priority (highest metric) data chunk in the queue is inspected. Information associated with the characteristics of the data chunk, e.g., priority, information associated with the compression benefit metric, etc., may be accessed. At operation 425, a determination is made based upon the results of the inspection as to whether to recompress the data. If the data has a positive compression benefit metric, indicating that recompressing the data will result in a performance increase, then the data is recompressed. Otherwise, the inspection process may continue for another high priority data block, e.g., newly arrived data, at operation 420. If the top element in the priority queue does not have a positive metric, then there is no work for the recompression accelerator module and the accelerator is idle. At 430, data selected for recompression is removed from the data queue and sent to the hardware accelerator for recompression. At operation 435, the data is recompressed with the hardware accelerator. At 440, the recompressed data chunk resulting from recompression is returned to the data queue. Once returned to the data queue, the priority is zero or negative, e.g., a '0' metric, as the data has been recompressed, and is now in best/optimal form.

Figure 4C:
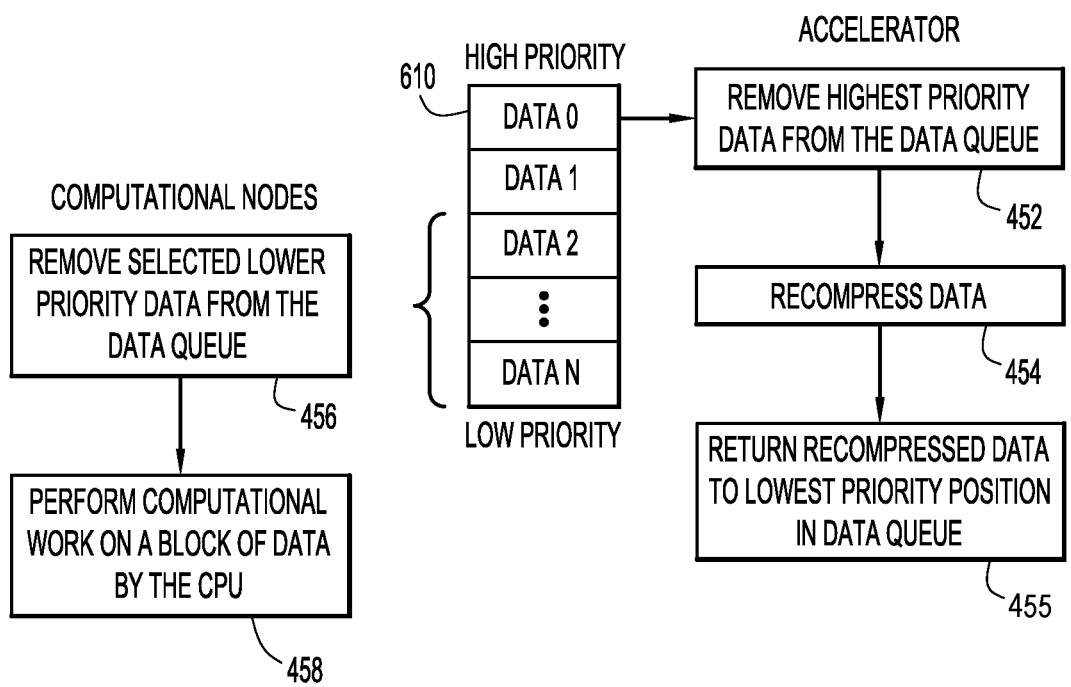

FIG. 4C shows an example flow diagram in which the CPU and hardware accelerator process data associated with the data queue. In general, the CPU will execute computational nodes whose input data has low priority in the data queue. At operation 456, the CPU removes selected lower priority data from the data queue. At operation 458, the CPU performs computational work on a block of data. A computational node may produce output data which is returned to the data queue, or may produce no output data. The accelerator recompresses data which has high priority in the data queue. At operation 452, this data is removed by the hardware accelerator from the data queue. At operation 454, data is recompressed by the accelerator. At operation 455, data is returned to the data queue, now with priority '0' and in the last position in the queue.

Figure 4D:
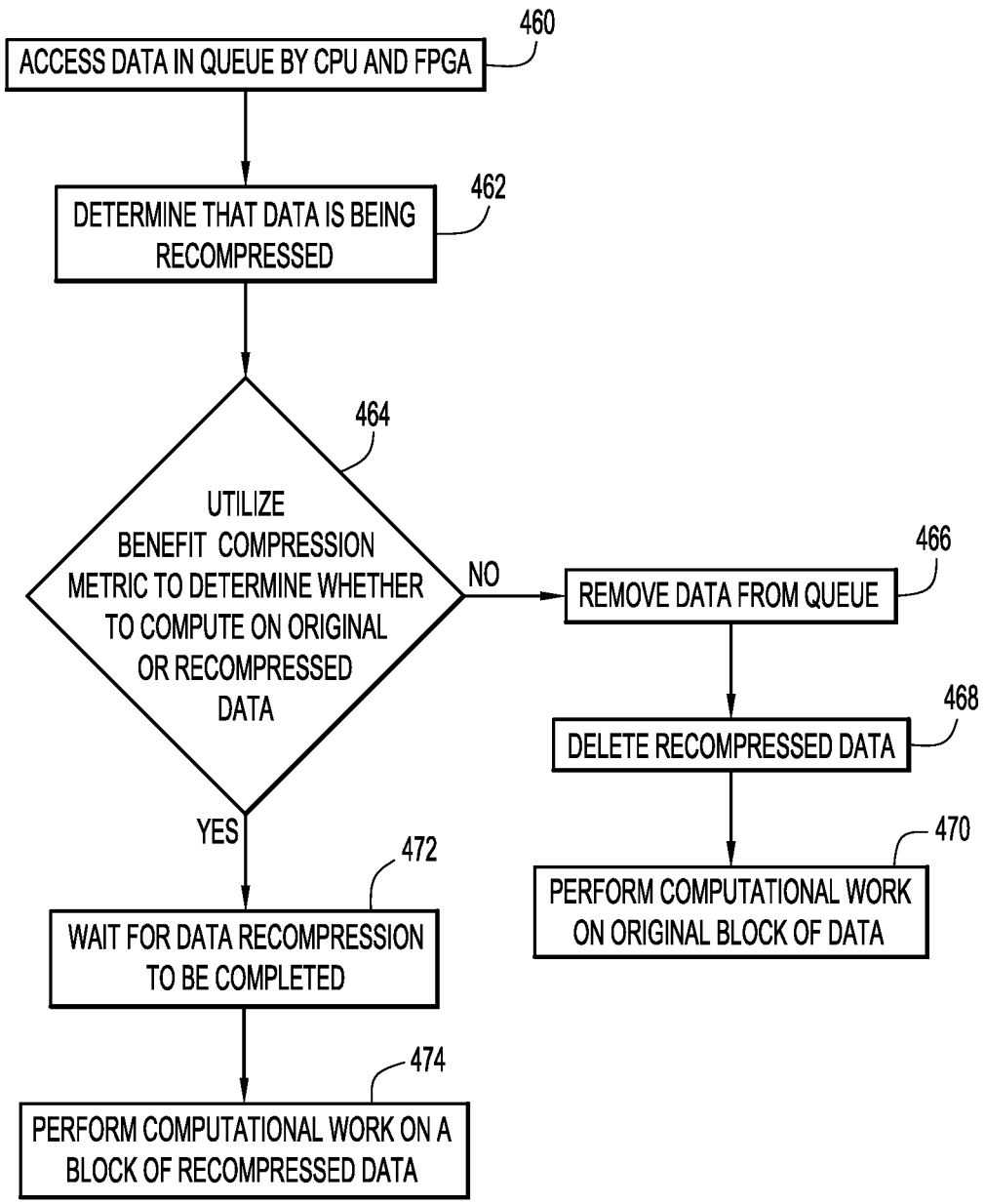

FIG. 4D shows another embodiment, in which a compression benefit metric may indicate to the CPU whether to perform computations on data that has not been recompressed or to wait for recompressed data. This scenario may occur if both the CPU and hardware accelerator attempt to access the same chunk of data at the same time, as shown at operation 460. At operation 462, it is determined that this chunk of data is currently being recompressed. (In this embodiment, even though the data is being recompressed, it is still visible to the CPU.) At operation 464, based upon a compression benefit metric, it is determined whether to perform computations on the original data, e.g., data that has not been recompressed, or wait for the data to finish recompression. At operation 466, due to the determination to perform computations on original data at operation 464, the data is removed from the queue at operation 466. At operation 468, corresponding data generated from recompression operations is deleted. At operation 470, computations are performed on data that has not been recompressed. At operation 472, due to the determination to perform computations on recompressed data at operation 464, the system waits for data recompression to be completed and written to the queue. At operation 474, computational work is performed by the CPU on recompressed data.

In other embodiments, for cases in which the hardware accelerator and CPU access the same block of data, the request from the CPU may be deferred if the CPU has sufficient other work available. In still other embodiments, if data is present in the queue, but is in the process of being recompressed, then the computational node is considered not to be ready, and another node may be processed instead. This may result in idle time for the CPU, if no other nodes are ready to run.

Figure 4E:
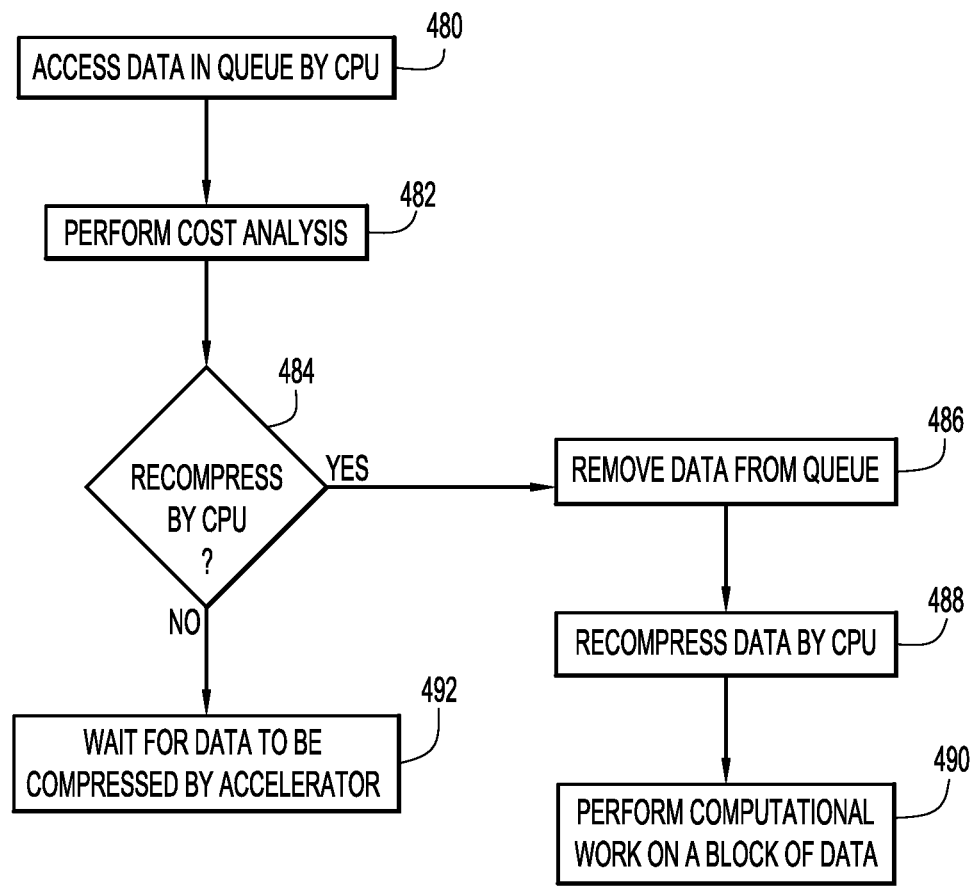

FIG. 4E shows an example flowchart in which the CPU or the hardware accelerator may be used to recompress data. At operation 480, data in the data queue is accessed by the CPU. At operation 482, computations are performed to determine whether it is faster for the CPU to perform recompression or whether it is faster (to possibly wait) for the hardware accelerator to perform recompression. If is the CPU is determined to be faster, then the CPU removes data from the data queue at operation 486. At operation 488, the CPU recompresses the data, and at operation 490, the CPU performs computations on the block of data. If the hardware accelerator is determined to be faster, then the data compression system will wait for the data to be compressed by the hardware accelerator at operation 492, and the CPU will compute on the recompressed data.

In some embodiments, multiple pathways, as shown in FIGS. 4A-4E, may be available. To determine the best path to choose, computations such as time estimates for each pathway may be performed. For example, for every request from the CPU, the following parameters may be estimated: (1) total time for CPU processing on the current version of the data (whether recompressed or original); (2) total time for recompressing the data using the hardware accelerator and then processing the recompressed data by the CPU; and (3) total time for recompressing the data using the CPU and then processing the recompressed data by the CPU. Information associated with the data chunk, e.g., priority, location in queue, information associated with the compression benefit metric as well as the current state of the CPU (e.g., idle or active) may also be factored into such computations. In general, the fastest pathway will be selected.

In still other embodiments, the data processing system may be configured not to wait for recompressed data to minimize CPU idle time.

FIG. 5 shows chunks of data moving through a portion of a data flow graph. Since CPU computation may be performed based upon a data flow graph, the accelerator becomes another node in the graph, potentially interposed along any or all edges. As data flows through the graph, the data has a tendency to become more and more poorly compressed. By allowing hardware to recompress data in between computations of the graph, computation may be accelerated.

The choice of which blocks to recompress is cost-based; in general, the accelerator performs as much work as it is able to do without causing the CPU to wait for data from the accelerator. Any data not recompressed or reformatted by the accelerator is operated on in the format (e.g., sub-optimal format) that it is presently in.

Nodes, e.g., 510 and 520, represent computational nodes of the CPU. The thickness of lines or edges connecting nodes corresponds to data volume. A thick edge at 530 represents a high volume of data, while a thin edge at 540 represents a lower volume of data. The top of the graph represents early stages in a computation, while the lower portion of the graph represents later or end stages in a computation. In general, recompressing high volumes of data, corresponding to operations performed early with respect to a data flow graph, will highly impact downstream computations.

A node may have 0 . . . n input edges, and 0 . . . n output edges. Edges represent short First In First Out (FIFO) queues between the nodes; the maximum length of the FIFO may be as low as 1 to simplify implementation, or may be considerably larger. Additionally, the graph may be explicit in the representation of a query plan, or partially linearized. Each chunk of data in a FIFO may be self-describing, that is, represented in uncompressed form as a set of, e.g., 4000 integers or strings, or may be compressed using a dictionary, run-length encoded, or a combination of encoding schemes.

As disclosed herein, each node may be augmented with an empirical measure of how much benefit, a compression benefit metric, is gained from having well-compressed data. This measure may be further refined for each possible incoming data format, e.g., for an integer sum or other integer based computation, RLE provides performance improvements linearly related to the size reduction of the data, while dictionary encoding provides little to no performance improvement. Each node may also be augmented with a measure of how much compression is preserved by the node.

An example of determining when data recompression would provide a useful benefit based upon position in the data graph is provided. Data chunks processed early in the data flow graph and having edges indicating a high volume of data would generally have higher priority in the accelerator queue than data chunks near the end of the graph and having corresponding edges indicating a lower volume of data. For example, an edge near the end of the graph will generally have a lower compression benefit metric, since data at this point experiences less computation before reaching the end of the graph. Edges earlier in the data graph having a high volume of data and associated with pathways having a high preservation score are likely to provide a substantial benefit from data recompression. As disclosed herein, these factors may contribute to a compression benefit metric, which drives a priority data queue feeding the accelerator.

Figure 6:
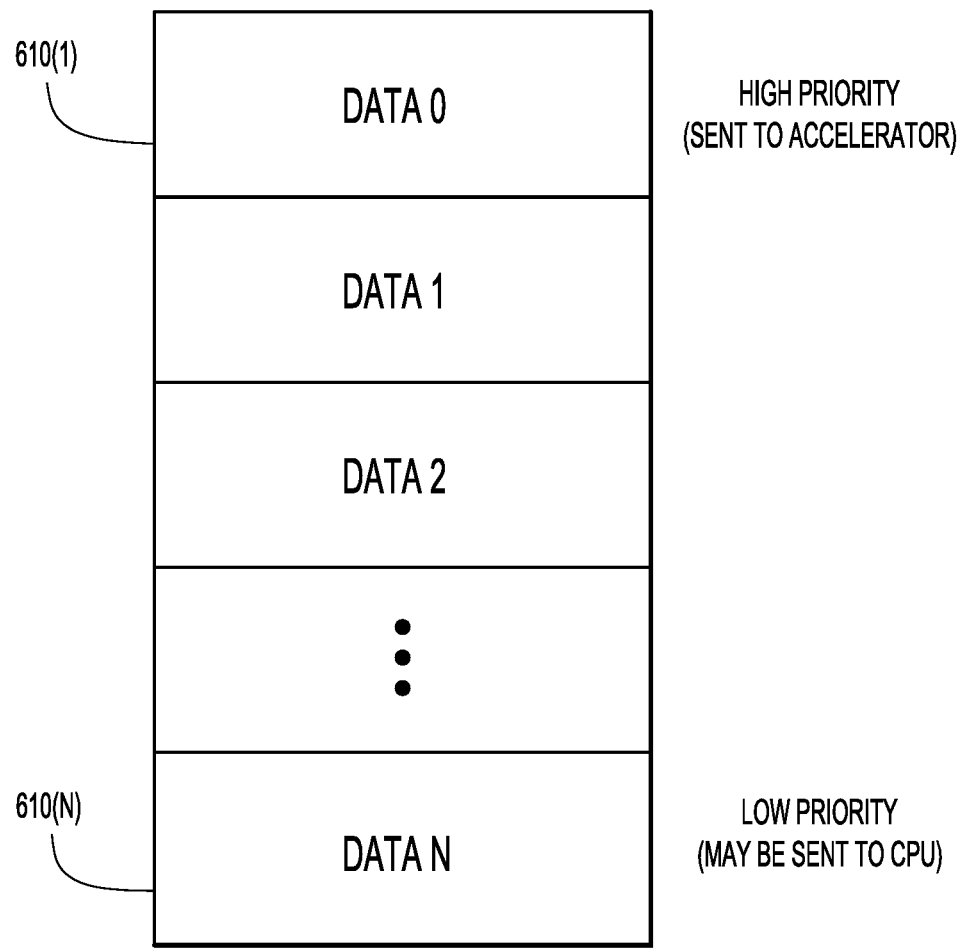
FIG. 6 is diagrammatic illustration of a priority queue of data according to an embodiment of the present invention.

FIG. 6 shows an example of a data queue. Data determined to have a higher priority 610(1) may be stored near the top of the queue, while data with a lower priority 610(N) may be stored near the bottom of the queue. Higher priority data corresponds to data having a metric score signifying that recompressing the data will improve computational efficiency. Data at the bottom of the queue comprises lower priority data, in which the computational cost of decompressing the data, reformatting, and recompressing by the accelerator does not provide a substantial improvement in overall performance. Data located near the bottom of the data queue may have already been recompressed. Accordingly, this data may be sent directly to the CPU for processing, especially in instances in which it is desired to provide a steady flow of data to the CPU for processing while other chunks of data are being recompressed. In some embodiments, a queue may be implemented as a heap data structure.

In another embodiment, nodes may be assigned a priority for processing data. For example, if no nodes in the dataflow graph have data to process, because all of the data is waiting to be recompressed or is in the process of being recompressed by the accelerator, then nodes may be selected to process data that is not recompressed. In this case, the priorities are used in the reverse sense—the nodes which would be able to compute upon data (because data is available, just not recompressed yet) are placed into a priority queue by the reverse of the data chunk priority. The node with the lowest data chunk priority is selected to process the non-recompressed data chunk having a low priority, and this chunk of data is removed from the accelerator queue in the process. If a node has multiple input data chunks pending, then the priority of each chunk may be combined to produce an overall node priority.

In this way, both the accelerator and the CPU are always busy, with the accelerator performing the most useful work possible, as the data provided to the accelerator has been selected from among a larger data set to provide the most benefit from recompression. Computational costs from recompression, e.g., time, power consumption, etc., are offset by downstream improvements in efficiency.

Figure 7:
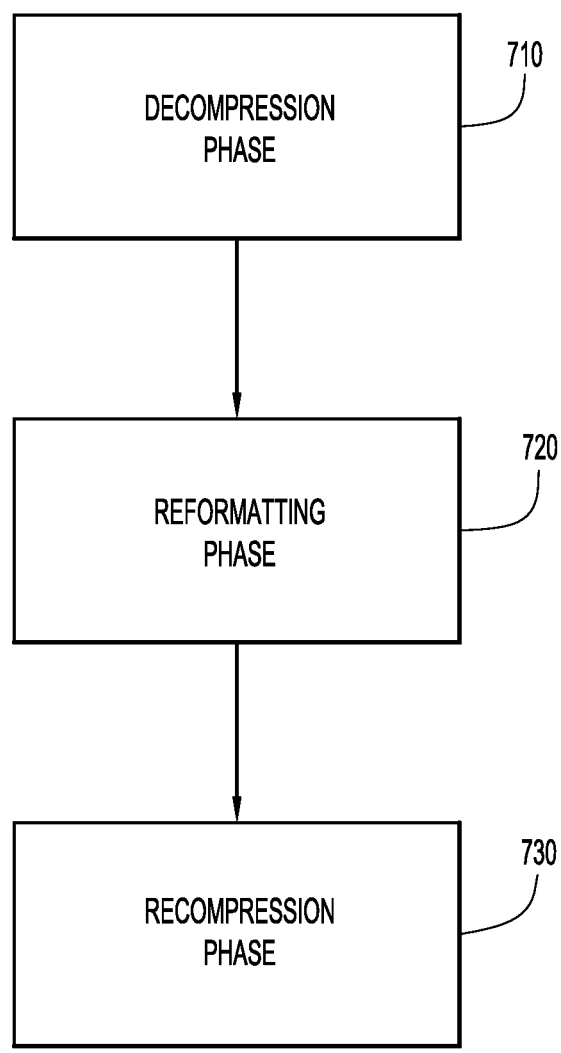
FIG. 7 shows phases of hardware-based compression and decompression, according to an embodiment of the present invention.

FIG. 7 shows various phases of the hardware accelerator. The accelerator comprises a decompression phase 710, a reformatting phase 720, and a recompression phase 730. Decompression phase 710 decompresses the compressed data. Reformatting phase 720 may reformat the data in order to provide optimal or improved compression during the recompression phase. At recompression phase 730, the reformatted data is compressed.

In some embodiments, the accelerator may not handle all data types, or decompress all types of compression, or handle all values of a particular data type, e.g., integer data with values exceeding 64 bits or 128 bits, or varchar data. In this case, the data chunk is not considered for recompression with the accelerator, but instead, may be recompressed in software provided that it has a high enough priority.

As disclosed herein, the recompression phase may implement a variety of compression/encoding schemes, including bitshaved compression, run-length encoding, and dictionary coding, as described below, as well as other schemes. The compressor may be biased by the edge metadata of FIG. 5, regarding an overall benefit of each type of compression as determined by a compression metric or score. In some embodiments, an encoding scheme may be selected that does not result in minimization of size, but instead, produces the most benefit by reducing processing time when the newly compressed data is processed by the CPU.

In a computationally heavy environment, any compression of a chunk of data may significantly improve the computational performance of later operations on that chunk of data. One or more compression nodes may be utilized to generate compressed data. The compressor itself evaluates which combination of nodes will produce the best compression or performance.

Descriptions and examples of different types of compression nodes are provided as follows. Data may be compressed or decompressed by CPU 135 or by the accelerator 145. The only primitive compression node (a node with no children) is a node that applies bitshaved encoding to input data. Bitshaved encoding is usually applied to numeric input, and represents values as offsets relative to a base value, storing a base value of a sequence (e.g., a lowest value, minimum value, zero, etc.) and the difference between the base value and another value of the sequence. If the base value is the minimum value, all offsets will be positive, and no sign bit will be required per value. Offsets are preferably selected according to the minimum number of bits required for the largest offset. Although additional bits are allowed, minimizing the number of bits is preferred for persistent storage.

Bitshaved representation also allows a scale factor to be applied to the offset. The scale factor may be constrained to be a power of 2, a power of 10, a product of small powers of 2, 3, and 5 (or some other set of primes) or may be an arbitrary multiplicand. This is useful, e.g., regarding timestamp data, which often has many trailing zeros in a decimal representation.

For a sequence of input values which are all equal, a bitshaved primitive compression node may be used to compress the sequence. For example, a sequence of input values: 2, 2, 2, 2, 2 may be encoded using bitshaved compression as bitshaved (base=2, scale=0, bits per value=0, bits=(0,0,0,0, 0)).

For a sequence of input values increasing by a variable amount, bitshaved compression may also be suitable for compressing the sequence. For example, a sequence of input values: 103, 98, 104, 97, and 98 may be encoded using a bitshaved primitive compression node as bitshaved (base=97, scale=0, bits per value=3, bits=(6,1,7,0,1)).

Another example of compression is Run Length Encoding (RLE). RLE is generally applied to a sequence of integers and has two children: a set of values and corresponding lengths. For each value, the number of times that the value repeats in a sequence is stored as length n. An example of applying RLE compression to the sequence of input values: 2, 2, 2, 3, 4, 4, 4, 5, 8, 8, 9 using a RLE compression node is rle(values=(2,3,4,5,8,9), lengths=(3,1,3,1,2,1)). Thus, because the value '2' repeats three times, a corresponding length of '3' is stored as well. RLE usually produces a value sequence that is shorter than the input sequence (the sequence to be compressed), and usually produces lengths which are non-zero.

Another example of compression is dictionary encoding. Dictionary encoding, has two children: a set of values, usually distinct from each other, as well as a corresponding set of keys, which are indices into the values. Dictionary encoding usually produces an output set of values which is smaller than the input sequence and which generally only contains values appearing in the input sequence. During compression, the dictionary entries may be sorted into ascending or descending order; if so, this may be indicated in the dictionary coding header, to allow simplified processing of certain types of computations performed on the encoded values.

For example, a sequence of input values: "Y", "Y", "Y", "N", "N", "Y", "Y", "Y", "N" may be encoded using dictionary encoding compression as dict(sorted=ascending, values=("N", "Y"), keys=(1,1,1,0,0,1,1,1,0)). In this example, "N" has a corresponding index of '0', and "Y" has a corresponding index of '1'. For values having lengthy character descriptions (e.g., city names, department names, etc.) a considerable benefit may be achieved with dictionary compression, as the resources needed to represent each value along with an associated index are much smaller than the resources needed to represent every full length occurrence of the value.

It is understood that present invention embodiments encompass not only the specific compression types described herein, but also, compression types associated with other types of compression as well.

In some embodiments, the accelerator may be limited to processing only some forms of data. For example, the accelerator might not handle character data. Or, the accelerator might only handle integers whose magnitude is less than some threshold (e.g., $2^{63}$ or $2^{128}$). Chunks which are not acceleration-capable in this way may be assigned the minimum priority, or may be skipped over for hardware accelerated recompression but still evaluated for recompression in the CPU, if the benefit is sufficient to balance the cost of recompression.

Figure 8:
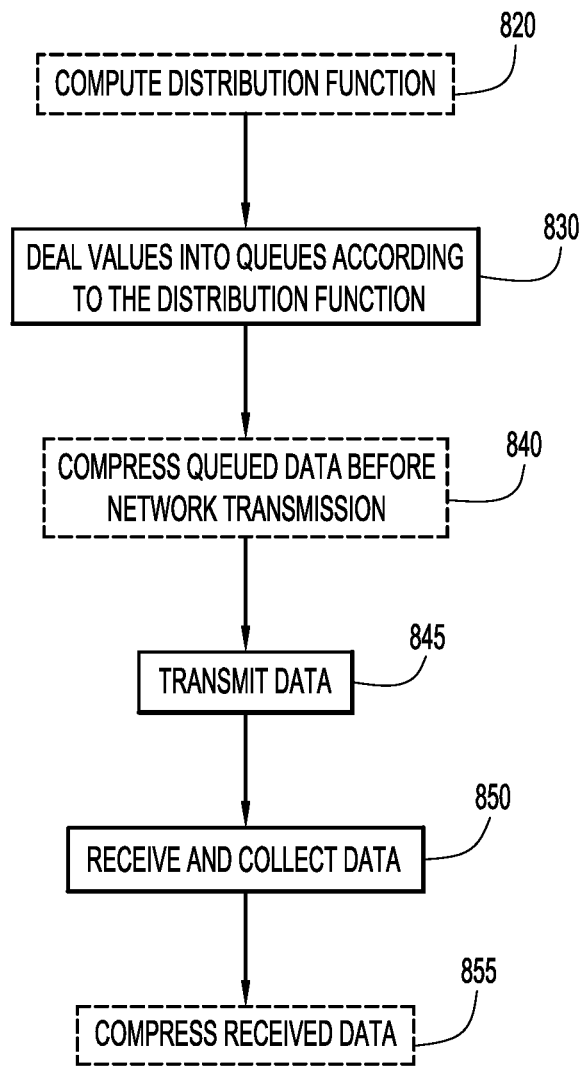
FIG. 8 is a procedural flow diagram of distributing data using a hardware accelerator based on a distribution function in accordance with an embodiment of the present invention.

FIG. 8 shows an example work flow by an accelerator for distributing data in a massively parallel distributed database. The accelerator, generally located near each network interface, is also responsible for management of network protocols.

With regard to standard algorithms for table joins and for grouping operations, a large amount of data may need to be shuffled or re-partitioned in a many-to-many way between members (e.g., nodes) of a distributed database. This shuffling may involve, e.g., for each backend node of a row-oriented database, dealing rows into per-destination buckets according to a distribution function. For columnar data, each column should be dealt separately, and therefore, the amount of work is typically more than in a row-based system. Furthermore, in some embodiments, it may be desirable to maintain compression while dealing data into a large number, e.g., hundreds, of buckets.

At operation 820, a distribution function is computed, e.g., at a source device that transmits data. The distribution function may be equal to one of the columns, may be computed from one or more of the columns, or may be provided as a separate stream of data computed earlier. In other embodiments, computing the distribution function could include utilizing an already-computed data value from the input.

The distribution function generally serves multiple functions, including: (1) to provide a near-uniform distribution of data across the recipients and/or (2) to deliver data from multiple sources to a common location. In some embodiments, the distribution function may be a hash function, but is not limited to such. Examples of distribution functions are included herein.

Functions used to provide a near-uniform distribution of data may include functions that do not depend on the contents of the data. In some embodiments, the distribution function may be a round-robin distribution function, in which each row is transmitted in turn to a different recipient, regardless of the contents of the columns. In other embodiments, a lumpy round-robin distribution function, in which each chunk of rows is transmitted to a different recipient, as a whole, may be utilized. In still other embodiments, if the distribution function depends on the contents of the data but is intended to result in a uniform distribution, then the distribution function may first map data from one or more columns onto an integer range such as [0, $2^{32}-1$] or [0, $2^{31}-1$] or [0, $2^{64}-1$] by using any well-known hash function, e.g., a Cyclic Redundancy Check (CRC), a cryptographic hash, etc. This value may then be mapped onto a collection of N recipients using a simple modulus operation, e.g., hash % N; a two-stage modulus operation using a prime, e.g., (hash % 65521) N; or a range partitioning operation e.g., (hash*N)/(MAX_HASH+1). In still other embodiments, if the column data is expected to be or known to be uniformly distributed, then the hash function may be omitted, using the column data directly in the modulus or range partitioning operation.

In other embodiments, the distribution function may be intended to deliver data from multiple sources to a common location, whenever the multiple sources have the same value in a certain column or set of columns, to enable join processing at the destination. In this case, the distribution function is computed as a function of the column or set of columns requiring co-location. In some embodiments, column values which appear different to the distribution function calculation represent the same value for the purposes of join processing, e.g., positive and negative zero in floating point data, string values having different numbers of trailing spaces, etc. In such cases, the distribution function should be able to compensate for such factors, by generating the same output for input values that represent the same value for purposes of join processing.

At operation 830, values are dealt into one or more queues according to the distribution function.

In some embodiments, queued data may be optionally compressed at operation 840, prior to network transmission at operation 845. Transmission queues may not be transmitted immediately; data may be accumulated over time, and as different queues become full, then the data is transmitted.

Two examples, not intended to be limiting, are provided herein. Regarding the first example, compression occurs at operation 840, prior to network transmission at operation 845. It is noted that transmission of data at 845 may be directed towards multiple destination nodes. Once the compressed data is received, the data is processed directly in compressed form. In this case, the compression algorithm is optimized not to minimize space needed to store compressed data, but for ease of computation downstream. For example, the compression scheme may be optimized for particular computation nodes, which exist downstream, or for a particular query according to present invention embodiments.

Regarding the second example, queue space is conserved by accumulating less data in a queue before transmission, e.g., one input chunk's worth, or an amount for an efficient network packet size of, e.g., 9 KB. Data, in this case, may be transmitted in uncompressed form, or with a simple compression scheme. Once the data is received, incoming data streams may be merged in order to provide sufficient data for better compression, and the merged data is compressed at operation 855.

At operation 850, data is received, e.g., at a receiver. The data may be in either compressed or uncompressed format. Direct Memory Access (DMA) may be used to access data from memory for one or more columns of data. For example, data may be received from a network interface, from a storage controller directly into an accelerator engine or into the memory of the accelerator engine, using DMA from the network interface or storage controller, from writing from a CPU, or from a DMA request from the accelerator engine.

Data packets may arrive from multiple sources. Accordingly, in some embodiments, the received data is merged into a reduced set of streams. Since each column is transmitted and received separately, a consistent decision across columns should be made regarding how to merge the received data, e.g., by selecting data according to the first column to arrive or by buffering data until all columns have arrived. For example, if two packets of first names are received from two different sources, the packets may arrive in any order. Likewise, if two packets of last names are received from those same two sources, these packets may also arrive in any order. With data from sources A and B, the received order may be "FirstA, FirstB, LastB, LastA", in which source A sent both FirstA and LastA and source B sent both FirstB and LastB. However, there is no coordination between the two data sources. Accordingly, the receiver must coordinate the data, e.g., by having a mechanism to pair the data FirstA, LastA for processing together, and to pair the data FirstB, LastB for processing together. In one approach, a receiver may receive FirstA, FirstB, LastB, and immediately queue the pair FirstA, LastB for further processing, which would match names incorrectly. Instead, FirstB, LastB should be observed to be a pair, or the system should wait for LastA to arrive so that FirstA, LastA can be processed together, if it is desired to process FirstA first.

If the transmission source has small buffers, then the received data may have poor compression. In this case, the receiver may also comprise a recompression module to decompress the received data (if compressed), to find coarser (larger) data chunk boundaries so that each data chunk contains more values, and therefore, can be better compressed. As part of this process, a compression benefit metric may be computed, as discussed herein, and data which will provide the most benefit from recompression may be identified and selected. At operation 855, which is optional in some workflows, uncompressed received data may be compressed, e.g., after being transmitted over a network and received. Incoming data streams from multiple sources may be merged, providing a higher volume of data for compression, which not only enables good compression to be achieved but also results in a much smaller computational cost for data queues stored in memory.

In other embodiments, the compressor may utilize knowledge of the local processing which will occur (e.g., type(s) of compression that can be processed most quickly by the particular processing to be done), and can optimize accordingly. Also, the compressor may have knowledge of local compression dictionaries, which may not be known to the sender of the received data.

Figure 9:
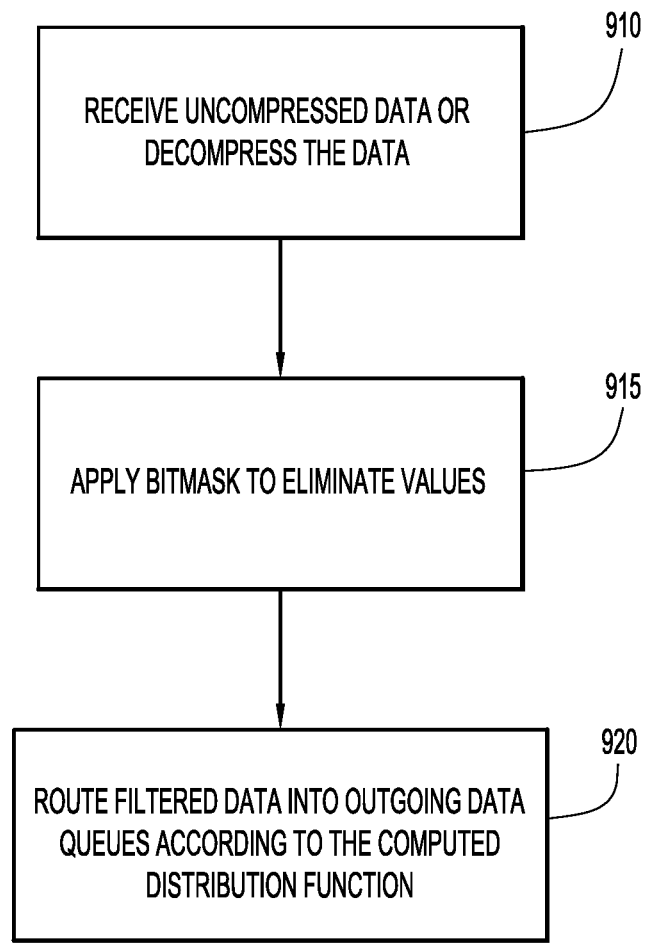
FIG. 9 is a flow diagram showing filtering as part of a data distribution flow in accordance with an embodiment of the present invention.

In still further embodiments, data may be subject to additional filtering as shown at FIG. 9. For each block of column data to be transmitted at operation 845, which may include the columns used to determine the distribution function, the following operations may apply. At operation 910, uncompressed data, e.g., the values in the block of data for the column, is received or the received data is decompressed to provide uncompressed data. At operation 915, a selection bitmask is applied to the data, keeping only the desired values before routing and, if applicable, recompression. The selection bitmask may be computed by the source system or any system having access to the source data. For example, the selection bitmask may be the result of a boolean expression evaluation on some of the columns of the source data. Additionally, if the columns are delayed relative to one another, the selection bitmask may be returned from the destination system to indicate which values are needed from the remaining columns. For example, the selection bitmask may indicate which rows survive one or more join operations based on tables present on the destination system. In this case, information for calculating which rows survive the join are transmitted first to the destination system, a chunk of join results is computed, and a chunk of boolean indicators of the join results is returned to the source system to determine which values from the other columns are to be transmitted. The set of surviving values may consist of all values from a chunk, no values from that chunk, or a subset. At operation 920, the remaining values may be routed into outgoing data queues according to the computed distribution function. In some cases, this may utilize an outside-the-FPGA Direct Random Access Memory (DRAM) module.

In some embodiments, one or more independent compression and transmission modules may be configured to monitor the queues. Whenever a queue is full or has enough data for efficient compression, the data from that queue is compressed at operation 840, if applicable, and transmitted at operation 845.

FIG. 10 illustrates an example block diagram of a system, configured to perform the techniques presented herein. The system may include a network interface unit 130, a processor/CPU 135, an accelerator 145 (e.g., FPGA or ASIC or other special-purpose CPU) and a memory 1030. The network interface unit 130 is configured to receive and send data over a network. I/O module 155 is configured to send and receive compressed data and to communicate with storage modules 170.

The processor 135 may be embodied by one or more microprocessors or microcontrollers, and executes software instructions stored in memory 1030 for queuing data and for assigning a compression benefit metric to data at 1040 and 1050, as well as compressing and decompressing data and distributing data at 1060 and 1070 as shown in FIGS. 1-9. Any of these four software components 1040, 1050, 1060 and 1070 may also be embodied in the computer readable media loaded into the accelerator (e.g., FPGA, ASIC, etc.) at startup time.

The hardware acceleration and distribution logic may include one or more modules or units to perform the various functions of present invention embodiments described above. The various modules (e.g., hardware acceleration logic (e.g., queuing logic 1040, metric scoring logic 1050, compression/decompression logic 1060), distribution logic 1070, etc.) may be implemented by any combination of any quantity of software and/or hardware modules or units, and may reside within memory 1030 of the back end system for execution by processor 135.

It is noted that blades/nodes 160 (of backend system 30) and front end system 20 may be implemented by any conventional or other computer systems preferably equipped with a display or monitor, a base (e.g., including at least one processor 135, one or more memories 1030 and/or internal or external network interfaces or communications devices 130 (e.g., modem, network cards, etc.)), optional input devices (e.g., a keyboard, mouse or other input device), and any commercially available and custom software (e.g., server/communications software, browser/interface software, compression and other modules, etc.).

It will be appreciated that the embodiments described above and illustrated in the drawings represent only a few of the many ways of implementing embodiments for hardware acceleration and data distribution.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software (e.g., hardware acceleration logic (e.g., queuing logic 1040, metric scoring logic 1050, compression/decompression logic 1060), distribution logic 1070, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., hardware acceleration logic (e.g., queuing logic 1040, metric scoring logic 1050, compression/decompression logic 1060), distribution logic 1070, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metric scores, queued data, distribution functions, etc.). The database system may be implemented by any number of any conventional or other databases, data stores or storage structures (e.g., files, databases, data structures, data or other repositories, etc.) to store information (e.g., metric scores, queued data, distribution functions, etc.). The database system may be included within or coupled to the server and/or client systems. The database systems and/or storage structures may be remote from or local to the computer or other processing systems, and may store any desired data (e.g., metric scores, queued data, distribution functions, etc.).

The present invention embodiments may employ any number of any type of user interface (e.g., Graphical User Interface (GUI), command-line, prompt, etc.) for obtaining or providing information (e.g., metric scores, queued data, distribution functions, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A data processing system comprising:
a first processor implementing a plurality of computational nodes, each node performing a corresponding operation in a data flow for data received at that node; and
a second processor operating in parallel with the first processor, wherein the first processor and second processor are configured to:
determine, via the first processor, a compression benefit metric pertaining to performance of the correspond- ing operations of one or more of said plurality of computational nodes in the data flow with recompressed data;

recompress the data in a first compression scheme flowing between said plurality of computational nodes to a second compression scheme, via the second processor during running of said plurality of computational nodes on said first processor, for processing by the one or more computational nodes in the data flow based on the compression benefit metric indicating a benefit in processing performance gained by using the recompressed data for computational operations; and perform the corresponding operations of the one or more computational nodes using the recompressed data, via the first processor, to provide the benefit in processing performance.

2. The data processing system of claim 1, wherein the compression benefit metric is determined using a measure of data compression preserved by one or more destination computational nodes.

3. The data processing system of claim 1, wherein the compression benefit metric is determined using a measure of an estimated reduction in a size of the data resulting from recompression.

4. The data processing system of claim 1, wherein the compression benefit metric is determined using a measure of an estimated computational benefit from a destination node performing an operation on recompressed data.

5. The data processing system of claim 1, wherein the compression benefit metric is determined using a measure of a computational benefit of a destination node performing an operation on data in a particular compressed form.

6. The data processing system of claim 1, wherein the first processor is configured to determine a priority for recompressing data based on the compression benefit metric, and the second processor is configured to recompress data according to the priority.

7. The data processing system of claim 1, wherein one or more of said plurality of computational nodes process data without recompression in response to data awaiting recompression by the second processor and being unavailable for processing.

8. The data processing system of claim 1, wherein the second processor is configured to:
decompress compressed data; and
compress the decompressed data and produce recompressed data.

9. The data processing system of claim 1, wherein the second processor includes a Field Programmable Gate Array (FPGA) or an Application Specific Integrated Circuit (ASIC) to recompress the data.

10. The data processing system of claim 1, further including a plurality of processors interconnected by a network to process data in parallel, wherein each processor is configured to:
apply a distribution function to distribute data among the plurality of processors;
compress data prior to transmission to the plurality of processors; and
compress data received from the plurality of processors.

11. A method of processing data using a plurality of computational nodes, each node performing a corresponding operation in a data flow for data received at that node, wherein each node is implemented by a first processor and utilizes a second processor operating in parallel with the first processor, and said method comprising:

determining, via the first processor, a compression benefit metric pertaining to performance of the corresponding operations of one or more of said plurality of computational nodes in the data flow with recompressed data;

recompressing the data in a first compression scheme flowing between said plurality of computational nodes to a second compression scheme, via the second processor during running of said plurality of computational nodes on said first processor, for processing by the one or more computational nodes in the data flow based on the compression benefit metric indicating a benefit in processing performance gained by using the recompressed data for computational operations; and performing the corresponding operations of the one or more computational nodes using the recompressed data, via the first processor, to provide the benefit in processing performance.

12. The method of claim 11, wherein the compression benefit metric is determined using one or more of the following:
(a) a measure of data compression preserved by one or more destination computational nodes;
(b) a measure of an estimated reduction in a size of the data resulting from recompression;
(c) a measure of an estimated computational benefit from a destination node performing an operation on recompressed data; and
(d) a measure of a computational benefit of a destination node performing an operation on data in a particular compressed form.

13. The method of claim 11, wherein determining a compression benefit metric further determines a priority for recompressing data based on the compression benefit metric, and recompressing the data comprises recompressing the data according to the priority.

14. The method of claim 11, wherein one or more of said plurality of computational nodes process data without recompression in response to data awaiting recompression by the second processor and being unavailable for processing.

15. The method of claim 11, further comprising:
decompressing compressed data via the second processor; and
compressing the decompressed data and producing recompressed data via the second processor.

16. The method of claim 11, wherein a plurality of processors interconnected by a network are utilized to process data in parallel, and said method further comprising:
applying a distribution function to distribute data among the plurality of processors;
compressing data prior to transmission to the plurality of processors; and
compressing data received from the plurality of processors.

17. A computer program product for processing data using a plurality of computational nodes, each node performing a corresponding operation in a data flow for data received at that node and implemented by a first processor and utilizing a second processor operating in parallel with the first processor, wherein the computer program product comprises one or more computer readable storage media collectively having computer readable program code embodied therewith, the computer readable program code, when executed by the first processor and second processor, causing the first processor and second processor to:
determine, via the first processor, a compression benefit metric pertaining to performance of the corresponding operations of one or more of said plurality of computational nodes in the data flow with recompressed data;

recompress the data in a first compression scheme flowing between said plurality of computational nodes to a second compression scheme, via the second processor during running of said plurality of computational nodes on said first processor, for processing by the one or more computational nodes in the data flow based on the compression benefit metric indicating a benefit in processing performance gained by using the recompressed data for computational operations; and perform the corresponding operations of the one or more computational nodes using the recompressed data, via the first processor, to provide the benefit in processing performance.

18. The computer program product of claim 17, wherein the computer readable program code is configured to cause the first processor to:

determine the compression benefit metric using one or more of the following:

(a) a measure of data compression preserved by one or more destination computational nodes;

(b) a measure of an estimated reduction in a size of the data resulting from recompression;

(c) a measure of an estimated computational benefit from a destination node performing an operation on recompressed data; and (d) a measure of a computational benefit of a destination node performing an operation on data in a particular compressed form.

19. The computer program product of claim 17, wherein the computer readable program code is configured to cause the first processor and second processor to:

determine, via the first processor, a priority for recompressing data based on the compression benefit metric, and recompress data, via the second processor, according to the priority.

20. The computer program product of claim 17, wherein the computer readable program code is configured to cause the first processor and second processor to:

apply a distribution function to distribute data among a plurality of processors interconnected by a network to process data in parallel;

compress data prior to transmission to the plurality of processors; and compress data received from the plurality of processors.

\* \* \* \* \*